No. 775,750. PATENTED NOV. 22, 1904.
W. H. HARDEN.
ANIMAL TRAP.
APPLICATION FILED JUNE 28, 1904.
NO MODEL. 3 SHEETS—SHEET 1.
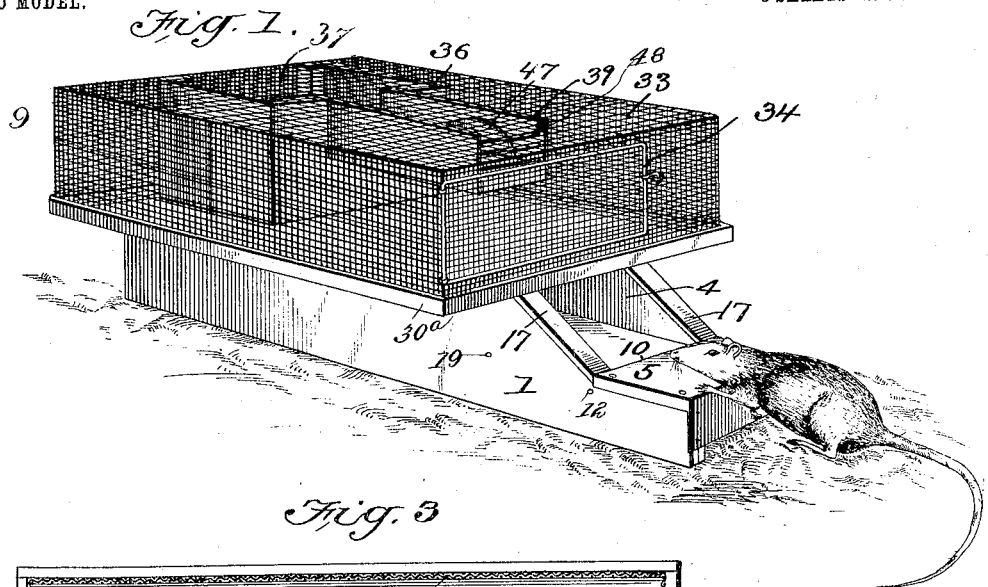
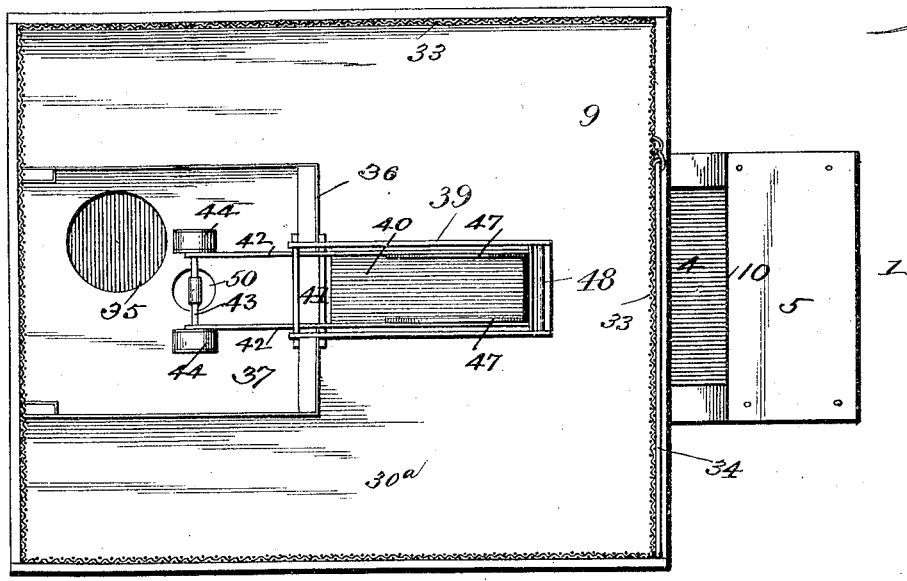
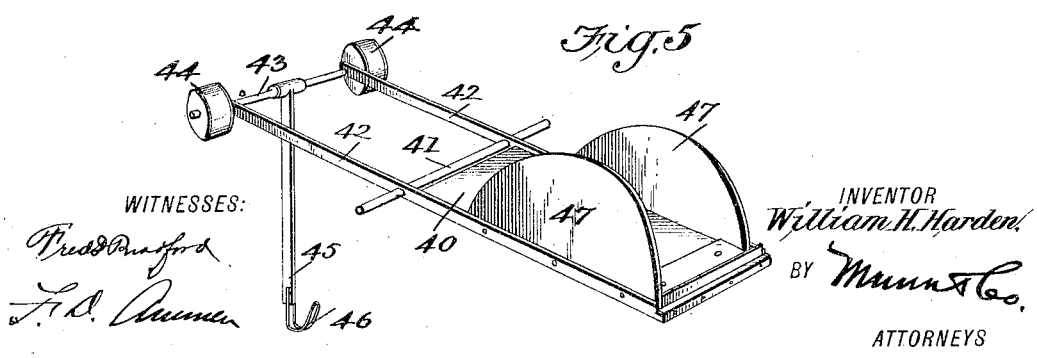
WITNESSES:
INVENTOR
William H. Harden
BY Munn & Co.
ATTORNEYS No. 775,750. PATENTED NOV. 22, 1904.
W. H. HARDEN.
ANIMAL TRAP.
APPLICATION FILED JUNE 28, 1904.
NO MODEL. 3 SHEETS—SHEET 2.
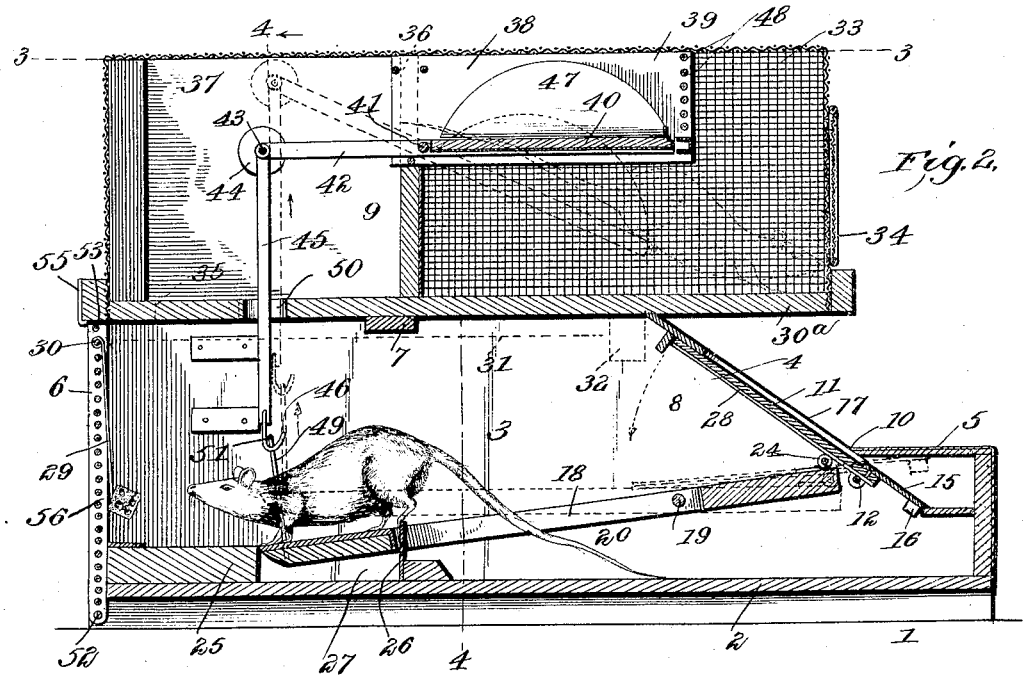
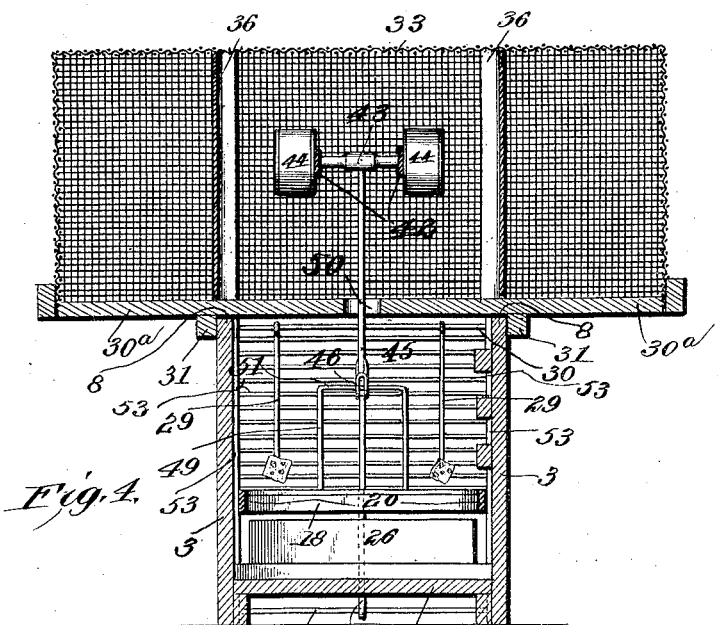
WITNESSES:
INVENTOR
William H. Harden
BY
ATTORNEYS No. 775,750. PATENTED NOV. 22, 1904.
W. H. HARDEN.
ANIMAL TRAP.
APPLICATION FILED JUNE 28, 1904.
NO MODEL. 3 SHEETS—SHEET 3.
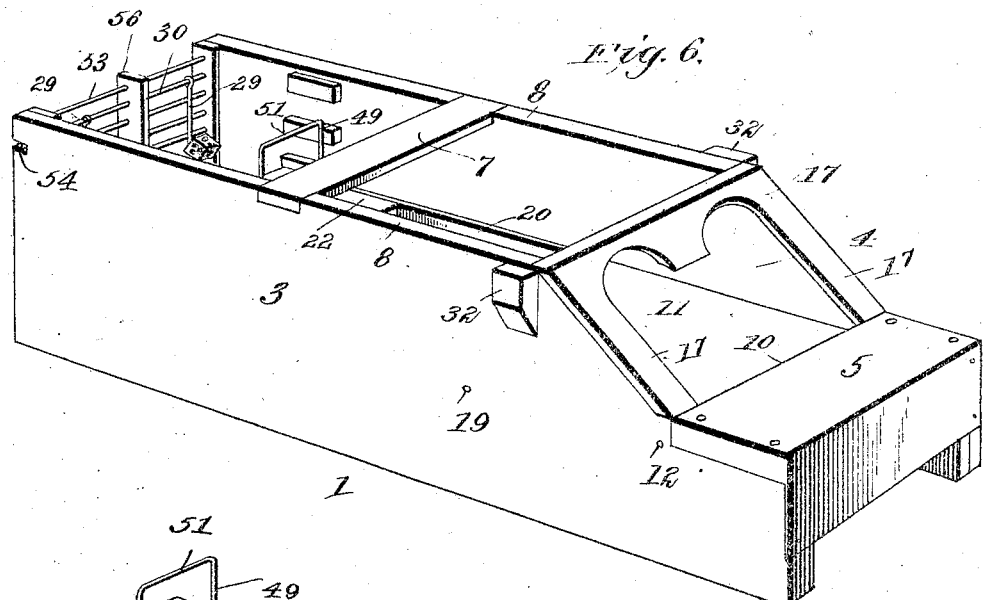

No. 775,750. Patented November 22, 1904.

UNITED STATES PATENT OFFICE.

WILLIAM HAMILTON HARDEN, OF QUITMAN, GEORGIA, ASSIGNOR OF ONE-HALF TO EDWIN A. GROOVER, OF JACKSONVILLE, FLORIDA.

ANIMAL-TRAP.

SPECIFICATION forming part of Letters Patent No. 775,750, dated November 22, 1904.

Application filed June 28, 1904. Serial No. 214,485. (No model.)

*To all whom it may concern:*

Be it known that I, WILLIAM HAMILTON HARDEN, a citizen of the United States, and a resident of Quitman, in the county of Brooks and State of Georgia, have made certain new and useful Improvements in Animal-Traps, of which the following is a specification.

My invention relates to animal-traps, and is adapted especially for catching rats or mice.

The object of the invention is to produce a trap which is sprung or shut automatically by the animal upon entering.

The trap comprises a removable cage or auxiliary body which the animal enters after the trap is shut. Automatic arrangement is made for resetting the trap by the weight of the animal after it has passed into the upper body or cage.

The invention consists in the construction and combination of parts to be more fully described hereinafter and definitely set forth in the claims.

In the drawings, which fully illustrates my invention, Figure 1 is a perspective of a trap, representing a rat about to enter the same. Fig. 2 is a longitudinal vertical section representing the trap in its sprung or closed position. Fig. 3 is a sectional plan taken substantially on the line 3 3 of Fig. 2. Fig. 4 is a vertical cross-section taken substantially on the line 4 4 of Fig. 2. Fig. 5 is a perspective representing in detail a drop-door which constitutes a feature of the cage. This view represents parts contiguous to and operated by the drop-door for resetting the trap. Fig. 6 is a perspective of the body of the trap, representing the cage as removed. Fig. 7 is a perspective of the platform used in connection with the body for controlling the door of the trap. Fig. 8 is a perspective of the door of the trap, representing the reverse or lower side thereof.

Throughout the drawings and specification the same numerals of reference denote like parts.

Referring more particularly to the parts, 1 represents the hollow or chambered body of the trap, which consists, as shown, of an elongated box-like structure having a floor 2, sides 3, and an inclined opening or doorway 4, before which doorway a door-step 5 is formed. The rear wall of this body 1 consists of a grating or grill 6. The body 1 is preferably open above, as shown most clearly in Fig. 6, and provided with a cross bar or brace 7, which is preferably jointed at its extremities in the upper edges 8 of the side walls 3. Upon the body 1 a removable cage or auxiliary body 9 rests, as indicated most clearly in Figs. 1 and 2. When in position, this cage substantially closes the upper side of the body. Its construction will be more fully described hereinafter.

In the forward portion of the body 1 and preferably substantially beneath the inner edge 10 of the door-step 5 a door 11 is pivotally supported upon a transverse pin 12, the said pin having projecting extremities 13 mounted in the side walls 3 of the body, as will be readily understood. The construction of this door 11 is most clearly shown in Fig. 8. It comprises a main panel 14 and a foot-piece 15, said foot-piece being disposed beyond the pivot pin or fulcrum 12 and carrying counterweights 16, adapted to partially counterbalance the weight of the main panel 14. As indicated, the door 11 is hung in such a manner that it may lie against the inner side of the door-frame 17 when the trap is sprung or shut.

In the lower portion of the body 1 of the trap there is provided a platform 18, the same being mounted to rock upon a transverse horizontal pin or arbor 19, the extremities whereof are carried in the side walls 3. This platform comprises side members 20, disposed longitudinally and connected at their extremities by plates or boards 21 22, the former being disposed at the forward extremity of the platform adjacent to the door 11 and affording means for mounting a transversely-disposed shaft 23, carrying rollers 24, as shown. The rear extremity of the platform 18 lies adjacent to a block 25, disposed upon the floor at the back of the body, and forwardly with respect to this block a fin or partition 26 projects upwardly from the floor 2 in such a manner as to form a space 27, into which the rear board 22 of the platform may be depressed, as indicated in Fig. 2. The purpose of this fin 26 will appear more fully hereinafter. As shown, the rollers 24 lie adjacent to the rear faces of the door 11 and are adapted to roll upon longitudinally-disposed wearing-strips 28, which are attached to the under or inner side of the door, as indicated. When the trap is in its set position, the door 11 and the platform 18 occupy, substantially, the position in which they are shown in dotted lines in Fig. 2, the forward extremity of the platform being depressed and supporting the door 11, which rests substantially horizontally thereupon.

In order to facilitate the baiting of the trap, bait-hooks 29 are provided, the same being preferably attached, by means of eyes at their upper extremities, to a horizontal bar 30 of the grating 6, referred to above.

The cage or upper body 9, already referred to, comprises a floor $30^a$ of substantially rectangular form, as shown, the same being provided upon its under side with longitudinally-disposed cleats 31, which are adapted to receive between them the upper edges 8 of the body 1. These cleats 31 abut at their forward extremities against blocks or chocks 32, attached to the outer faces of the side walls 3, as shown. Evidently mounting the upper body in this manner facilitates maintaining the same in position and assists in replacing the same after removal. The floor $30^a$ constitutes the bottom of an inclosure or cage-body 33, formed, preferably, of wire-gauze or similar material, as shown, the same being provided with a door 34 in its forward wall for the purpose of facilitating the removal of animals which find their way into the cage. The floor $30^a$ is provided near its rear edge with an opening 35, which communicates with the interior of the body 1, and the space in the cage-body 33 above this opening is inclosed by a wall or partition 36, three sides whereof are preferably of sheet metal, as indicated. In this manner a compartment 37 is formed in the upper body just above the rear portion of the trap, and this compartment 37 is in communication with a gallery 38, the sides 39 whereof constitute extensions of the partition-wall 36. The floor of this gallery 38 consists of a platform or drop-door 40, which is mounted to rock upon a transverse horizontal pin 41, the extremities whereof are carried in the side walls 39, as shown. In its construction this drop-door or drop comprises side bars 42, preferably disposed parallel, as shown, and connected at their rear extremities by a cross-head 43, the same projecting therebeyond and carrying counterweights 44, adapted to maintain the drop-door 40 normally in a horizontal position. From substantially the middle point of the cross-head 43 a bar 45 depends, the same terminating below in a hook 46, the purpose of which will appear more fully hereinafter. At its sides the drop-door 40 is provided with cheeks or plates 47, which lie adjacent to the inner faces of the side walls 39 of the gallery, as shown. The forward wall of the gallery 38 is preferably formed of a grating 48, composed of horizontal bars, as shown.

Adjacent to the hook 46 a yoke 49 is located, the same being carried by and projecting substantially vertically from the rear board 22 of the platform 18. In order to enable the bar 45 to depend from the cross-head 43 in the manner described, the floor 30 of the cage is provided with an opening 50, through which the same passes. It should be stated that when the trap is in its set position the transverse or horizontal bar 51 of the yoke 49 occupies an elevated position with respect to the hook 46.

Referring again to the rear wall or grating 6 of the body 1, it should be said that the lowest bar 52 thereof constitutes the axis of a hinged joint, enabling the entire grating to be rotated rearwardly in order to facilitate the baiting of the hooks 29. The bar 53 projects, as shown, at its extremities and is received in notches or recesses 54, formed in the rear edges of the side walls 3, the said notches constituting stops to limit the forward movement of the grating, as will be readily understood. The grating is maintained in its upright position by means of a cleat or clip 55, which is attached to the rear edge of the floor $30^a$, projecting below the same, as indicated, so as to abut against the rear edge of a central bar 56 of the grating.

The mode of operation of the trap will now be described. Supposing the trap to be in its set position, the door 11 and the platform 18 will then occupy substantially the positions in which they are shown in dotted lines in Fig. 2. When so arranged, it will appear that the door lies substantially horizontally in the doorway, and the doorway is unobstructed to allow an animal to pass through. The animal having passed through the doorway would proceed toward the bait at the rear of the body. In order to do this, however, he must pass over the rear board 22 of the platform 18, depressing the same. As shown, as the rear extremity of the platform 18 is depressed the forward extremity is of course elevated, and through the medium of the rollers 24 the platform operates to close the door 11, so that the door and platform would assume substantially the relation shown in full lines in Fig. 2. The parts having been moved into this position will maintain such position until the trap is reset. The animal having been caught in the body 1 soon finds the opening 35, through which he passes into the compartment 37. He finds the gallery 38, and passing into the same his weight depresses the drop-door 40, so that the animal is eventually precipitated into the principal compartment of the cage.

As the drop-door 40 sinks with the weight of the animal the bar 45 is raised into the dotted position in which it is shown. As it rises the hook 46 engages the horizontal bar 51 of the yoke 49 in such a manner as to raise the rear extremity of the platform 18. Returning the platform 18 in this manner to a horizontal position permits the door 11 to descend again to its normal horizontal position, resting upon the platform, and it should be understood that the door and platform will normally maintain themselves in the set position. In this connection it should be stated that the counterweights 16, used at the forward edge of the door, are not sufficient to completely counterbalance the weight of the door; but their addition is intended to enable the position of equilibrium of the platform and door to be nicely adjusted.

The fin 26, which was described as projecting upwardly from the floor, is useful in preventing the animal passing his body into the space 27 beneath the rear board 22 of the platform in such a manner as to raise the same at this point, which would open the trap.

The baiting of the trap is readily accomplished without removing the cage 9 by simply tipping the rear edge thereof upwardly in such a manner as to disengage the clip 55 from the grating 6. When this is done, evidently the grating can be swung downwardly, so as to enable the hooks 29 to be readily baited. This manner of baiting the trap is considered very advantageous, as it does not necessitate the dislocating of the hook 46 from its position below the yoke 49, it being understood that if the hook and yoke did not occupy the proper relative position the automatic resetting of the trap could not be effected.

The cheeks or plates 47 operate advantageously to prevent any possibility of the animal's feet or its tail being caught at the edge of the drop-door 40, which might prevent the same from returning to its normal position.

The employment of the grating 6 to constitute the rear wall of the body is also considered advantageous, as it allows the light to be seen therethrough from the front of the trap, so as to invite the entrance of the animal. This open construction is advantageous also in facilitating the dissemination of the scent of the bait. Likewise the open construction at the forward wall of the gallery 38 is considered advantageous in allowing light to pass, giving the animal the impression that he may find exit in that direction from the compartment 37.

When the trap is visited by an attendant, the cage 9, which should contain all the animals caught, would be removed from the body 1 and the animals caught be removed from the same through the door 34. In case the attendant should observe that the trap was not in its set position he would become apprised of the fact that an animal was in the body and had not passed into the principal compartment of the cage.

Throughout the interior of the trap at points likely to be gnawed by the animal metal strips or similar devices would be attached, as will be readily understood.

Having thus described my invention, what I claim as new, and desire to secure by Letters Patent, is—

1. In an animal-trap, in combination, a door adapted to close the entrance to said trap, a platform within said trap and adapted to actuate said door, said platform having an expanse upon which the animal may stand, said trap presenting a guarded space into which said expanse may descend.

2. In an animal-trap, in combination, a swinging door adapted to close the entrance to the trap, a rocking platform adapted to actuate said door and having an expanse adapted to receive the animal's weight and members disposed at the edges of said expanse and adapted to guard the under side thereof when said expanse descends.

3. In an animal-trap, in combination, a movable door adapted to close the entrance to said trap, a platform adapted to actuate said door, a compartment into which an entrapped animal may pass, and automatic mechanism connecting with said platform to operate said door so as to reset said trap.

4. In an animal-trap, in combination, a door adapted to close the entrance to said trap, a depressible platform adapted to actuate said door, a compartment which an entrapped animal may enter, a depressible member in said compartment, mechanism connecting the same with said door to reopen it and means for preventing the return of an entrapped animal from said compartment.

5. In an animal-trap, in combination, a chambered body, automatic means for closing said trap when an animal enters the same, a cage in communication with said body, a drop-door adapted to precipitate an animal within said cage and mechanism connected with said drop-door for reopening the door.

6. In an animal-trap, in combination, a chambered body, automatic means for controlling admission thereto by an animal within said body, a cage in communication with said body, a swinging door in connection with said cage and mechanism connected with said swinging door for reopening the door.

7. In an animal-trap, in combination, a chambered body, a door therefor, a lever which may support said door in a closed position, a cage in communication with said body, a drop-door in said cage at which the animal may pass, and mechanism connecting said drop-door with said lever to open said door.

8. In an animal-trap, in combination, a chambered body, a door therefor, a platform constituting a lever and adapted to actuate said door, a cage disposed above said body and communicating therewith, a drop-door in said cage and a depending bar actuated by said drop-door and connecting with said platform to control said door.

9. In an animal-trap, in combination, a chambered body, a door for said body, automatic means for closing said door, a cage disposed above said body and having a compartment communicating therewith, said compartment having a gallery, a drop-door constituting the floor of said gallery, said cage comprising a second compartment to which said drop-door leads, and means for reopening said drop-door.

10. In an animal-trap, in combination, a chambered body, a door therefor, automatic means for closing said door, a cage having a compartment in communication with said body and a gallery leading from said compartment, a second compartment beyond said gallery, a drop-door constituting the floor for said gallery and constituting a lever, a depending bar carried by said lever and passing downwardly into the said body, said bar affording means for opening said door.

11. In an animal-trap, in combination, a chambered body, a door therefor, a depressible platform normally occupying an elevated position and adapted to actuate said door, a cage above said body and communicating therewith, a bar depending from said cage and normally occupying a depressed position, members carried by said bar and said platform which may engage each other, and automatic means for actuating said bar.

12. In an animal-trap, in combination, a chambered body, a door therefor, a depressible platform adapted to actuate said door and normally occupying an elevated position, a yoke carried by said platform, a cage disposed above said body and communicating therewith, a bar depending from said cage and normally occupying a depressed position, said bar having a hook adapted to engage said yoke, and automatic means for actuating said bar.

13. In an animal-trap, in combination, a chambered body, a door therefor, a depressible platform adapted to actuate said door, a yoke attached to the upper side thereof, a cage disposed above said body and having a compartment communicating therewith, a gallery in communication with said compartment, said cage having a second compartment with which said gallery may communicate, a drop-door constituting the bottom for said gallery, and having a substantially horizontal axis of rotation, said drop-door constituting a lever, a bar depending from said drop-door and having a hook disposed below said yoke, there being an opening in the floor of said cage through which said bar depends.

14. In an animal-trap, in combination, a body having a hinged rear wall and a removable cage supported upon said body and adapted to maintain said rear wall in position.

15. In an animal-trap, a body having a hinged wall, means for attaching bait on the inner side of said wall, a removable cage communicating with the interior of said body, and means carried by said cage for supporting said wall.

16. In an animal-trap, in combination, a chambered body, a removable cage in communication therewith, a door for said body, a member carried by said cage, a member within said body, and adapted to actuate said door, and stops adapted to abut said cage to bring said members into operative alinement.

17. In an animal-trap, in combination, a body having an entrance thereto and inclosed sides, said body having a rear wall consisting of a grating formed of horizontal bars, the lowermost of said bars constituting an axis of rotation for said grating, hooks attached to an upper bar and depending within the said body to receive bait and a removable cage disposed above said body and having a clip engaging the upper portion of said grating to maintain the same in an upright position.

18. In an animal-trap, in combination, a chambered body, a door adapted to close the entrance thereto, a platform constituting a lever for controlling the said door, said platform having an upwardly-extending yoke, a removable cage disposed above said body and having a depending bar adapted to actuate said lever, the rear wall of said body being hinged at the lower edge thereof, and means carried by said cage for engaging the upper edge of said rear wall to maintain the same in an upright position.

19. In an animal-trap, a compartment adapted to confine the animals, a drop-door leading thereto and upwardly-disposed plates attached to the edges of said drop-door.

20. In an animal-trap, in combination, a compartment adapted to confine the animals, a gallery communicating therewith and having substantially vertical side walls, a drop-door constituting the floor for said gallery and having vertical extensions attached at the edges thereof adjacent to said side walls.

WILLIAM HAMILTON HARDEN.

Witnesses:
ADAM BEASLEY,
W. A. DAVIS.